(No Model.)

E. C. COMSTOCK.
SPRING TOOTH HARROW.

No. 291,840. Patented Jan. 8, 1884.

Attest:
N. Sprague
E. Scully

Inventor.
Eben C. Comstock
By Thos. S. Sprague
Att'y.

N. PETERS, Photo-Lithographer, Washington, D. C.

UNITED STATES PATENT OFFICE.

EBEN C. COMSTOCK, OF SPRINGPORT, MICHIGAN, ASSIGNOR TO HIMSELF AND CHARLES J. COMSTOCK, OF SAME PLACE.

SPRING-TOOTH HARROW.

SPECIFICATION forming part of Letters Patent No. 291,840, dated January 8, 1884.

Application filed June 9, 1883. (No model.)

*To all whom it may concern:*

Be it known that I, EBEN C. COMSTOCK, of Springport, in the county of Jackson and State of Michigan, have invented new and useful Improvements in Spring-Tooth Harrows; and I do hereby declare that the following is a full, clear, and exact description thereof, reference being had to the accompanying drawings, which form a part of this specification.

This invention relates to certain new and useful improvements in spring-tooth harrows; and the novelty consists in the construction and arrangement of parts, as will be more fully hereinafter set forth, and specifically pointed out in the claims.

The object of the invention is to provide a means for clearing the teeth, as occasion may require, without the necessity of changing the gage which governs their projection into the ground, as is required in the device patented by me, and as described in Letters Patent No. 267,404, dated November 14, 1882, upon which patent this invention is designed to be an improvement.

Figure 1:
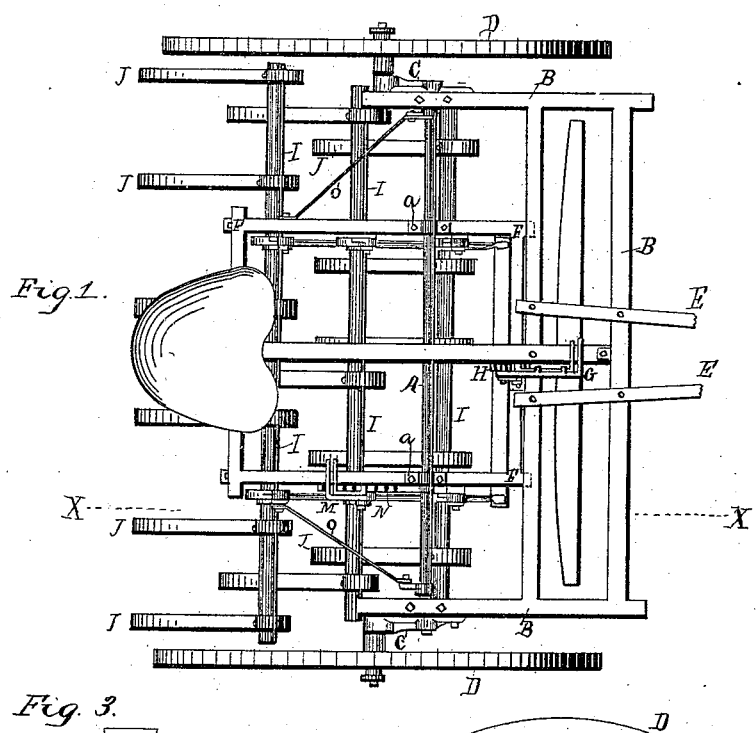
Figure 3:
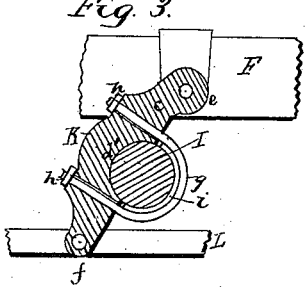
Figure 2:
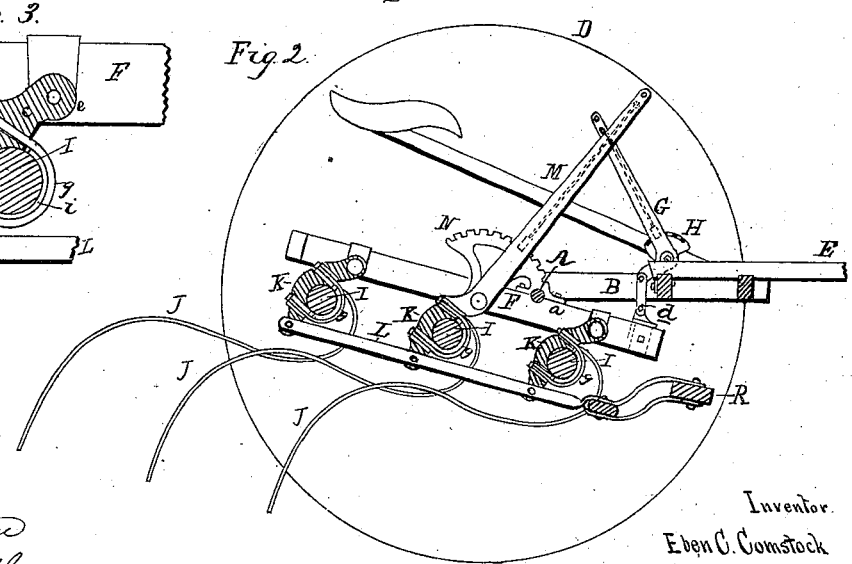

Figure 1 of the drawings is a top plan of my improved harrow. Fig. 2 is a vertical section on the line X X in Fig. 1. Fig. 3 is a detail view of one of the clips and its attachments.

In the accompanying drawings, which form a part of this specification, A represents an iron shaft, the ends of which are journaled to the ends of the main frame B, and the ends of this shaft project beyond the sides of the said main frame, and to the ends of this shaft are secured the stub-axles C, which carry the traction-wheels D of the device. These stub-axles may be provided, if desired, with any of the usual and known means for vertically adjusting them with relation to the shaft to which they are secured.

E are the shafts or guiding-tongue to which the animals used are attached. A supplemental frame, F, is secured beneath the shaft A by means of the boxes $a$, and the front end of this supplemental frame F is pivotally connected to a link, $d$, the opposite end of which is connected to the shorter arm of the L-shaped lever G, which is pivotally secured to the frame B, which also has secured to it a notched segment, H, these parts being so arranged that by a proper movement of the lever G the front end of the supplemental frame may be tilted downward, so that the teeth in rear will be thrown upward to allow the débris which may have collected in front of them to be discharged.

I are rolling heads, to which are attached, in the usual manner, the spring-teeth J. These heads are secured to the clips K, which are formed in two parts, as shown in Fig. 3, where $c$ represents a casting with a semicircular recess, $d'$, and two projecting ears, $e$ $f$, the ear $e$ being pivotally secured to the frame F, while the ear $f$ is pivotally secured to the connecting-rods L. The other part of this clip is formed by the U-shaped bolt $g$, the free ends of which pass through the clip, as shown in Fig. 3, where they are secured by nuts $h$. Interposed between the heads I and the parts $g$ of this clip is a semicircular cast-iron plate, $i$, the whole being so arranged as to firmly clasp and hold the heads and compel all the teeth to leave the ground when the lever M is actuated for that purpose, as described in the Letters Patent above referred to, the segment N affording the means of locking the lever in position and governing the depth to which the teeth may be thrown.

To the front end of the connecting-rods L are pivotally secured draft-connecting devices R, as shown in Fig. 2, which will allow the traces of the animals employed to be attached thereto, so that the draft applied to the teeth is brought nearest to the greatest point of resistance of such teeth when in operation, and all weight is relieved from the necks of the animals, which give direction to the device by the shafts or pole E.

O are suitable braces extending from near the outer ends of the shaft A to nearly the rear ends of the frame F, for the purpose of preventing any lateral motion of said frame, and so arranged as not to interfere with the tilting of the frame when the latter is desired.

What I claim as my invention is—

1. In a spring-tooth harrow, and in combination with a main frame supported on a main shaft having stub-axles, a supplemental tilting frame carrying a series of pivoted brackets, having rolling heads provided with spring-teeth, and connected by rods, as L, having pivoted connections with the draft, means upon the supplemental frame for manipulating said roller-heads simultaneously, and means upon the main frame for tilting the supplemental frame to relieve the teeth from trash, as set forth.

2. The combination, with the main frame B and main shaft A, having stub-axles C, of the supplemental frame F, having rolling heads I, with spring-teeth J, the clips K, connecting-rods L, lever M, and toothed segment N, as and for the purposes set forth.

3. The combination, with the main frame B and supplemental frame F, having rolling heads I, with spring-teeth J, as shown, of the clips K, connecting-rods L, lever M, the lever G, link d, and toothed segments H and N, as and for the purposes set forth.

4. In combination with the supplemental frame F, rolling heads I, connecting-rods L, and lever M, the clips K, composed of the castings pivoted at one end to the frame and at the other to the said rods L, the U-shaped bolts g, nuts h, and semicircular bearing-plates i, as and for the purposes set forth.

EBEN C. COMSTOCK.

Witnesses:
J. COPPENS,
N. SMITH.